United States Patent
Song et al.

(10) Patent No.: US 11,322,736 B2
(45) Date of Patent: May 3, 2022

(54) NEGATIVE ELECTRODE, SECONDARY BATTERY INCLUDING THE SAME, AND METHOD OF PREPARING THE NEGATIVE ELECTRODE

(71) Applicant: LG CHEM, LTD., Seoul (KR)

(72) Inventors: Jun Hyuk Song, Daejeon (KR); Oh Byong Chae, Daejeon (KR); Eun Kyung Kim, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 134 days.

(21) Appl. No.: 16/465,995

(22) PCT Filed: Jun. 8, 2018

(86) PCT No.: PCT/KR2018/006547
§ 371 (c)(1),
(2) Date: May 31, 2019

(87) PCT Pub. No.: WO2018/226070
PCT Pub. Date: Dec. 13, 2018

(65) Prior Publication Data
US 2019/0280286 A1    Sep. 12, 2019

(30) Foreign Application Priority Data

Jun. 8, 2017  (KR) .................. 10-2017-0071647
Jun. 8, 2018  (KR) .................. 10-2018-0065929

(51) Int. Cl.
*H01M 4/134*    (2010.01)
*H01M 4/1395*   (2010.01)
(Continued)

(52) U.S. Cl.
CPC ......... *H01M 4/134* (2013.01); *H01M 4/0426* (2013.01); *H01M 4/131* (2013.01);
(Continued)

(58) Field of Classification Search
None
See application file for complete search history.

(56) References Cited

U.S. PATENT DOCUMENTS 7,838,154 B2    11/2010  Matsushima et al.
2002/0012846 A1  1/2002  Skotheim et al.
(Continued)

FOREIGN PATENT DOCUMENTS

CN    1511351 A    7/2004
CN    1639889 A    7/2005
(Continued)

OTHER PUBLICATIONS

European Search Report for Appl. No. 18813669.1 dated Oct. 9, 2019.
(Continued)

*Primary Examiner* — Amanda J Barrow
(74) *Attorney, Agent, or Firm* — Birch, Stewart, Kolasch & Birch, LLP.

(57) ABSTRACT

TA negative electrode, a secondary battery including the same, and a method of preparing the negative electrode are provided. The negative electrode, which includes a current collector; a negative electrode active material layer disposed on the current collector; a first layer disposed on the negative electrode active material layer and including Li; and a second layer disposed on the first layer and including an
(Continued)

inorganic material is provided. A loading amount of the first layer may satisfy Equation 1:

$$0.65 \times (x_1 - y_1) < \text{loading amount of the first layer} < 0.95 \times (x_1 - y_1).$$ [Equation 1]

7 Claims, 4 Drawing Sheets

(51) Int. Cl.

| | | |
|---|---|---|
| H01M 4/04 | (2006.01) | |
| H01M 10/052 | (2010.01) | |
| H01M 4/38 | (2006.01) | |
| H01M 4/1393 | (2010.01) | |
| H01M 4/1391 | (2010.01) | |
| H01M 4/62 | (2006.01) | |
| H01M 4/131 | (2010.01) | |
| H01M 4/133 | (2010.01) | |
| H01M 4/36 | (2006.01) | |
| H01M 4/02 | (2006.01) | |
| H01M 4/48 | (2010.01) | |
| H01M 4/58 | (2010.01) | |
| H01M 4/587 | (2010.01) | |
| H01M 10/0525 | (2010.01) | |

(52) U.S. Cl.
CPC ......... *H01M 4/133* (2013.01); *H01M 4/1391* (2013.01); *H01M 4/1393* (2013.01); *H01M 4/1395* (2013.01); *H01M 4/366* (2013.01); *H01M 4/382* (2013.01); *H01M 4/62* (2013.01); *H01M 10/052* (2013.01); *H01M 4/483* (2013.01); *H01M 4/58* (2013.01); *H01M 4/587* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2005/0079421 A1* | 4/2005 | Konishiike | H01M 4/386 |
| | | | 429/231.95 |
| 2005/0095504 A1 | 5/2005 | Kim et al. | |
| 2005/0147888 A1 | 7/2005 | Yamamoto et al. | |
| 2006/0019167 A1 | 1/2006 | Li | |
| 2006/0051677 A1 | 3/2006 | Matsushima et al. | |
| 2007/0190408 A1* | 8/2007 | Inoue | H01M 50/431 |
| | | | 429/145 |
| 2010/0330430 A1* | 12/2010 | Chung | H01M 4/40 |
| | | | 429/224 |
| 2011/0159361 A1 | 6/2011 | Minami et al. | |
| 2011/0267001 A1* | 11/2011 | Hiraoka | H02J 7/0086 |
| | | | 320/107 |
| 2012/0070742 A1 | 3/2012 | Chung et al. | |
| 2012/0315548 A1* | 12/2012 | Fujikawa | H01M 10/0569 |
| | | | 429/330 |
| 2014/0045079 A1 | 2/2014 | Kozinsky et al. | |
| 2014/0079961 A1 | 3/2014 | Zhong et al. | |
| 2015/0372306 A1* | 12/2015 | Muraoka | H01M 4/587 |
| | | | 429/217 |
| 2016/0141608 A1 | 5/2016 | Ryu et al. | |
| 2016/0336625 A1 | 11/2016 | Jeong et al. | |

FOREIGN PATENT DOCUMENTS

| | | | | |
|---|---|---|---|---|
| CN | 101222072 A | 7/2008 | | |
| CN | 100514716 C | 7/2009 | | |
| CN | 102110848 A | 6/2011 | | |
| CN | 102185142 A | 9/2011 | | |
| CN | 102782926 A | 11/2012 | | |
| CN | 102916165 A | 2/2013 | | |
| CN | 104103809 A | 10/2014 | | |
| CN | 104617259 A | 5/2015 | | |
| CN | 105185938 A | 12/2015 | | |
| CN | 106159313 A | 11/2016 | | |
| JP | 2002-352801 A | 12/2002 | | |
| JP | 2003-123740 A | 4/2003 | | |
| JP | 2004-165097 | * | 6/2004 | ............ H01M 4/02 |
| JP | 2004-165097 A | 6/2004 | | |
| JP | 2005-63805 A | 3/2005 | | |
| JP | 2005-166469 A | 6/2005 | | |
| JP | 2007-273459 A | 10/2007 | | |
| JP | 2010-160984 A | 7/2010 | | |
| JP | 2012-199179 A | 10/2012 | | |
| JP | 2013-143206 A | 7/2013 | | |
| JP | 2014-63738 A | 4/2014 | | |
| KR | 2002-0091748 A | 12/2002 | | |
| KR | 10-0542213 B1 | 1/2006 | | |
| KR | 10-2010-0127730 A | 12/2010 | | |
| KR | 10-2014-0032577 A | 3/2014 | | |
| KR | 10-2014-0083181 | * | 7/2014 | ............ H01M 4/02 |
| KR | 10-2014-0083181 A | 7/2014 | | |
| KR | 10-2016-0057813 A | 5/2016 | | |

OTHER PUBLICATIONS

International Search Report for PCT/KR2018/006547 (PCT/ISA/210) dated Sep. 21, 2018.

* cited by examiner

[FIG 1]
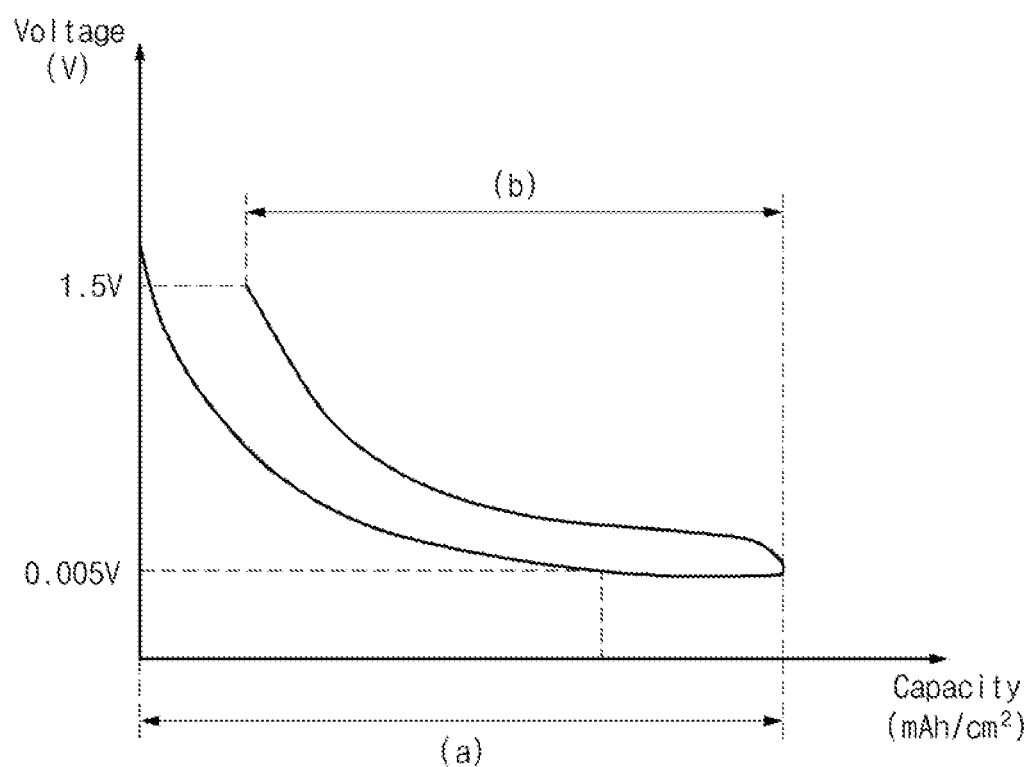

[FIG. 2]
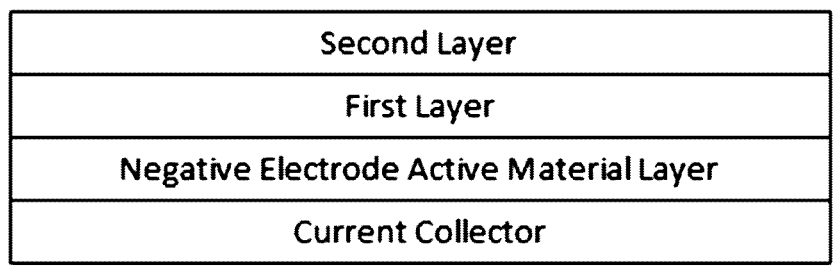

[FIG. 3]
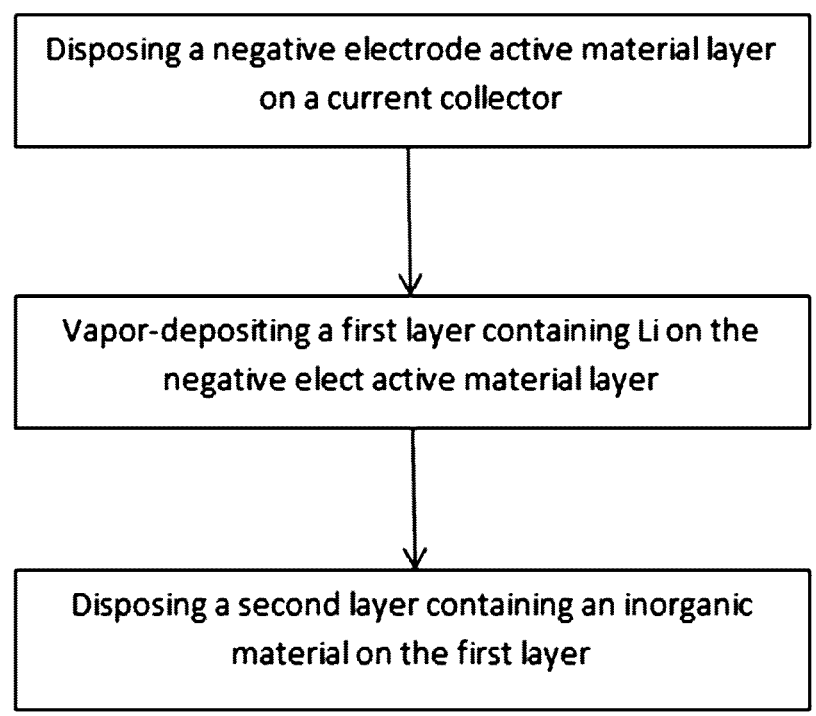

【FIG. 4】
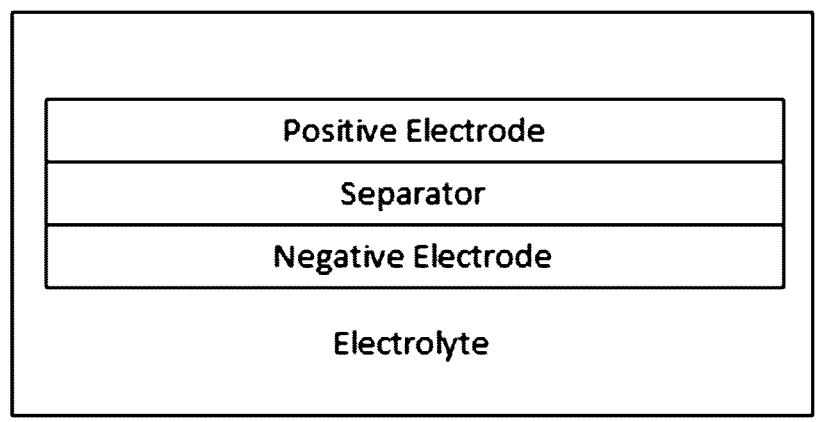

NEGATIVE ELECTRODE, SECONDARY BATTERY INCLUDING THE SAME, AND METHOD OF PREPARING THE NEGATIVE ELECTRODE

CROSS-REFERENCE TO RELATED APPLICATION

This application claims priority to and the benefit of Korean Patent Application No. 10-2017-0071647, filed on Jun. 8, 2017 and Korean Patent Application No. 10-2018-0065929 filed on Jun. 8, 2018, the disclosures of which are incorporated herein by reference in their entirety.

TECHNICAL FIELD

The present invention relates to a negative electrode, a secondary battery including the same, and a method of preparing the negative electrode, and particularly, to a negative electrode, which includes a current collector; a negative electrode active material layer disposed on the current collector; a first layer disposed on the negative electrode active material layer and including Li; and a second layer disposed on the first layer and including an inorganic material, wherein a loading amount of the first layer may satisfy Equation 1 below.

$$0.65 \times (x_1 - y_1) < \text{loading amount of the first layer} < 0.95 \times (x_1 - y_1) \quad \text{[Equation 1]}$$

In Equation 1, $x_1$ is a charge loading amount of the negative electrode active material layer, and $y_1$ is a discharge loading amount of the negative electrode active material layer. Units of the loading amount of the first layer, the charge loading amount and the discharge loading amount are $mAh/cm^2$, the charge loading amount and the discharge loading amount are capacities per unit area measured in a half-cell which includes a lithium metal electrode and an electrode including the negative electrode active material layer, wherein the charge loading amount is a capacity per unit area of the half-cell when a charging current decreases to 0.005C after the half-cell being charged at a constant current (CC) until a potential difference of the electrode including the negative electrode active material layer with respect to the lithium metal electrode becomes 0.005V, and then charged at a constant voltage (CV), and the discharge loading amount is a difference between the capacity per unit area of the half-cell and the charge loading amount when a potential difference of the electrode including the negative electrode active material with respect to the lithium metal electrode while the half-cell is discharged at a constant current becomes 1.5V.

BACKGROUND ART

A dramatic increase in the use of fossil fuels results in an increasing demand for the use of alternative energy or clean energy, and as part of this, the most actively researched fields are fields of power generation and electricity storage using an electrochemical reaction.

Today, a representative example of an electrochemical device using such electrochemical energy may be a secondary battery including the same, and the scope of the application thereof is gradually expanding. In recent years, according to the increase in technological development and demands for portable devices such as portable computers, mobile phones, cameras, etc., the demand for secondary batteries as an energy source is dramatically increasing, various studies have been made on lithium secondary batteries with high energy density, that is, high capacity, have been conducted, and the batteries have been commercialized and widely used.

Generally, a secondary battery consists of a positive electrode, a negative electrode, an electrolyte and a separator. Wherein, the negative electrode includes a current collector and a negative electrode active material, which may be disposed on the current collector. To increase an energy density of the negative electrode, although a variety of negative electrode active materials such as silicon, etc., are used, there are problems of a decreased capacity of the battery and a deterioration of the lifespan property, due to a high irreversible capacity.

To solve this, there was an attempt to solve the problem of irreversible capacity by applying lithium to the negative electrode active material layer (Chinese Unexamined Patent Application Publication No. 102916165). However, when a separate layer consisting of lithium is disposed on a negative electrode active material layer through such techniques, the high reactivity of lithium leads to the formation of a native oxide film, which cannot smoothly resolve the problem of irreversible capacity. In addition, when a layer containing lithium is formed through solution spraying, which is one of the above-mentioned techniques, the layer becomes excessively thick, and non-uniform.

Accordingly, there are demands for a method of preparing a negative electrode and a negative electrode, which can smoothly resolve the problem of irreversible capacity by preventing the generation of the native oxide film and easily control a loading amount of the layer containing lithium.

PRIOR ART LITERATURE

Patent Literature (Patent Literature 1) Chinese Unexamined Patent Application Publication No. 102916165

DISCLOSURE

Technical Problem

To attain the present invention, the present invention is directed to providing a method of preparing a negative electrode and a negative electrode, which can smoothly resolve the problem of irreversible capacity by preventing the generation of the native oxide film and easily control a loading amount of the layer containing lithium.

Technical Solution

According to an exemplary embodiment of the present invention, there is provided a negative electrode, which includes a current collector; a negative electrode active material layer disposed on the current collector; a first layer disposed on the negative electrode active material layer and containing Li; and a second layer disposed on the first layer and containing an inorganic material, wherein a loading amount of the first layer satisfies Equation 1 below.

$$0.65 \times (x_1 - y_1) < \text{loading amount of the first layer} < 0.95 \times (x_1 - y_1) \quad \text{[Equation 1]}$$

In Equation 1, $x_1$ is a charge loading amount of the negative electrode active material layer, and $y_1$ is a discharge loading amount of the negative electrode active material layer. Units of the loading amount of the first layer, the charge loading amount and the discharge loading amount are mAh/cm², the charge loading amount and the discharge loading amount are capacities per unit area measured in a half-cell which includes a lithium metal electrode and an electrode including the negative electrode active material layer, wherein the charge loading amount is a capacity per unit area of the half-cell when a charging current decreases to 0.005C after the half-cell being charged at a constant current (CC) until a potential difference of the electrode including the negative electrode active material layer with respect to the lithium metal electrode becomes 0.005V, and then charged at a constant voltage (CV), and the discharge loading amount is a difference between the capacity per unit area of the half-cell and the charge loading amount when a potential difference of the electrode including the negative electrode active material with respect to the lithium metal electrode while the half-cell is discharged at a constant current becomes 1.5V. A method of preparing a negative electrode, which includes disposing a negative electrode active material layer on a current collector, vapor-depositing a first layer containing Li on the negative electrode active material layer using a Li-containing raw material as a source, and disposing a second layer containing an inorganic material on the first layer, is provided.

Advantageous Effects

According to a method of preparing a negative electrode according to an exemplary embodiment of the present invention, a second layer containing an inorganic material is formed on a first layer containing lithium, and thus a problem of irreversible capacity can be smoothly resolved by preventing the generation of a native oxide film formed through oxidation of the lithium during the process. In addition, since the first layer is formed by vacuum deposition, a loading amount of the first layer is easy to control and thus a content and lifespan of the negative electrode can be improved. Moreover, the lithium oxidation can be further more prevented by the second layer, and when the negative electrode is used together with the separator, thermal resistance of the separator can be improved, and thus stability of a battery can be increased.

DESCRIPTION OF DRAWINGS

FIG. 1 is a charging/discharging graph (potential to capacity) of a half-cell which includes a lithium metal electrode and an electrode including a negative electrode active material layer of the present invention.

FIG. 2 is a schematic of a negative electrode according to an embodiment of the present invention.

FIG. 3 is a flow chart of a method for forming a negative electrode according to an embodiment of the present invention.

FIG. 4 is a schematic of a secondary battery including a negative electrode according to an embodiment of the present invention.

MODES OF THE INVENTION

Hereinafter, the present invention will be described in further detail to help in understanding the present invention.

The terms and words used in the specification and the claims should not be interpreted as being limited to conventional or literal meanings, but should be interpreted with meanings and concepts which are consistent with the technological scope of the invention based on the principle that the inventors have appropriately defined concepts of terms in order to describe the invention in the best way.

The terms used in the specification are used only to explain specific examples, not to limit the present invention. Singular expressions include plural referents unless clearly indicated otherwise in the context.

The terms "include," "comprise," and "have" used herein should be understood to designate the presence of stated characteristics, numbers, steps, components or a combination thereof, and not preclude the possibility of the presence or addition of one or more other characteristics, numbers, steps, components or a combination thereof.

A negative electrode according to an exemplary embodiment of the present invention, as shown in FIG. 2, may include a current collector, a negative electrode active material layer disposed on the current collector; a first layer disposed on the negative electrode active material layer and containing Li; and a second layer disposed on the first layer and containing an inorganic material, wherein a loading amount of the first layer may satisfy Equation 1 below.

$$0.65 \times (x_1 - y_1) < \text{loading amount of the first layer} < 0.95 \times (x_1 - y_1)$$ [Equation 1]

In Equation 1, $x_1$ is a charge loading amount of the negative electrode active material layer, and $y_1$ is a discharge loading amount of the negative electrode active material layer. Units of the loading amount of the first layer, the charge loading amount and the discharge loading amount are mAh/cm², the charge loading amount and the discharge loading amount are capacities per unit area measured in a half cell which includes a lithium metal electrode and an electrode including the negative electrode active material layer, wherein the charge loading amount is a capacity per unit area of the half-cell when a charging current decreases to 0.005C after the half-cell being charged at a constant current (CC) until a potential difference of the electrode including the negative electrode active material layer with respect to the lithium metal electrode becomes 0.005V, and then charged at a constant voltage (CV), and the discharge loading amount is a difference between the capacity per unit area of the half-cell and the charge loading amount when a potential difference of the electrode including the negative electrode active material with respect to the lithium metal electrode while the half-cell is discharged at a constant current becomes 1.5V.

The current collector is not particularly limited as long as it does not cause a chemical change in a battery and has conductivity, and may be, for example, stainless steel, aluminum, nickel, titanium, baked carbon, or aluminum or stainless steel of which a surface is treated with carbon, nickel, titanium or silver. In addition, the current collector may conventionally have a thickness of 3 μm to 500 μm, and an adhesive strength of the positive electrode active material may be increased by forming fine irregularities on the surface of the collector. For example, the current collector may be used in various forms such as a film, a sheet, a foil, a net, a porous body, a foamed body, and a non-woven fabric body.

The negative electrode active material layer may be disposed on the current collector. Specifically, the negative electrode active material layer may be disposed on one or both surfaces of the current collector.

The negative electrode active material layer may include a negative electrode active material. As the negative electrode active material, a compound capable of reversible intercalation and deintercalation of lithium may be used. As a specific example, the negative electrode active material may be a carbon-based material such as hard carbon, soft carbon, artificial graphite, natural graphite, graphitized carbon fiber, or amorphous carbon; a metallic compound which is able to form an alloy with lithium, such as Si, Al, Sn, Pb, Zn, Bi, In, Mg, Ga, Cd, a Si alloy, a Sn alloy or an Al alloy; a metal oxide for doping/dedoping lithium, such as $SiO_x$ (0<x<2), $SnO_2$, a vanadium oxide, or a lithium vanadium oxide; or a composite including the metallic compound and a carbon material, such as a Si—C composite or Sn—C composite, and any one or a combination of two or more thereof may be used. Specifically, the negative electrode active material may be at least one selected from the group consisting of a carbonaceous material, $SiO_x$ (0<x<2), $SnO_2$, a Si—C composite, and a Sn—C composite. In addition, as the negative electrode active material, a metal lithium thin film may be used. In addition, the carbon material may be any one of low crystalline carbon and high crystalline carbon. As a representative example, the low crystalline carbon is soft carbon or hard carbon, and the high crystalline carbon is high temperature baked carbon, for example, amorphous, platy, flaky, spherical or fiber-shaped natural or artificial graphite, Kish graphite, pyrolytic carbon, mesophase pitch-based carbon fiber, meso-carbon microbeads, mesophase pitches and petroleum or coal tar pitch derived cokes.

The negative electrode active material layer may further include a binder. The binder may be at least one selected from the group consisting of a polyvinylidenefluoride-hexafluoropropylene copolymer (PVDF-co-HFP), polyvinylidenefluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), sulfonated EPDM, styrene butadiene rubber (SBR), fluoro rubber, a material in which hydrogen is substituted with Li, Na or Ca, and various copolymers thereof.

The negative electrode active material layer may further include a conductive material. The conductive material is not particularly limited as long as it has conductivity without causing a chemical change in the battery, and may be, for example, a graphite such as natural graphite or artificial graphite; a carbon black such as acetylene black, ketjen black, channel black, furnace black, lamp black or thermal black; a conductive fiber such as carbon fiber or a metal fiber; a conductive tube such as a carbon nanotube; a metal powder such as fluorocarbon powder, aluminum powder or nickel powder; a conductive whisker such as zinc oxide or potassium titanate; a conductive metal oxide such as titanium oxide; or a conductive material such as a polyphenylene derivative.

The first layer may be disposed on the negative electrode active material layer. The first layer may contain Li, and specifically, consists of Li. The Li contained in the first layer may be inserted into a negative electrode during initial charging to offset an irreversible capacity of the negative electrode. Generally, the irreversible capacity of the negative electrode occurs when some of the lithium transferred from a positive electrode to a negative electrode during the first charging remains in the negative electrode due to a film-forming reaction of the negative electrode and non-use of the lowest potential. According to the present invention, the lithium in the first layer has an equilibrium reaction with the negative electrode active material layer during injection of an electrolyte after battery assembly, and lithium not participating in the reaction among the lithium in the first layer is inserted into the negative electrode. Accordingly, at the time of subsequent charging, an amount of lithium transferred from the positive electrode to the negative electrode may be reduced. Therefore, since the state of charge (SOC) can be reduced, the structural collapse of a positive electrode material may be prevented, SOC corresponding to a part having a low resistance among total SOCs of the negative electrode may be used as a practical use area of the battery. For this reason, a capacity of a secondary battery including the same may increase, and a lifespan characteristic may be improved.

The loading amount of the first layer may satisfy Equation 1 below.

$$0.65 \times (x_1 - y_1) < \text{loading amount of the first layer} < 0.95 \times (x_1 - y_1) \quad \text{[Equation 1]}$$

In Equation 1, $x_1$ is a charge loading amount of the negative electrode active material layer, and $y_1$ is a discharge loading amount of the negative electrode active material layer. Units of the loading amount of the first layer, the charge loading amount and the discharge loading amount are $mAh/cm^2$, the charge loading amount and the discharge loading amount are capacities per unit area measured in a half cell which includes a lithium metal electrode and an electrode including the negative electrode active material layer, wherein the charge loading amount is a capacity per unit area of the half-cell when a charging current decreases to 0.005C after the half-cell being charged at a constant current (CC) until a potential difference of the electrode including the negative electrode active material layer with respect to the lithium metal electrode becomes 0.005V and then charged at a constant voltage (CV) ((a) of FIG. 1), and the discharge loading amount is a difference between the capacity per unit area of the half-cell and the charge loading amount when a potential difference of the electrode including the negative electrode active material with respect to the lithium metal electrode while the half-cell is discharged at a constant current becomes 1.5V ((b) of FIG. 1). When satisfying the above-described range of Equation 1, an energy density of the secondary battery per unit volume may be at the maximum level, and the lifespan characteristic may be improved. At this time, all of the loading amount of the first layer, a charge loading amount and a discharge loading amount are capacity loading amounts.

When the loading amount of the first layer exceeds $0.95 \times (x_1 - y_1)$, a larger amount of lithium than lithium accommodated in the negative electrode is transferred from the positive electrode to the negative electrode during initial full-charging after the injection of an electrolyte solution, and thus lithium is precipitated on a surface of the electrode. Accordingly, an increasing thickness of the negative electrode results in a decrease in energy density and a decrease in battery stability. When the loading amount of the first layer is less than $0.65 \times (x_1 - y_1)$, since a surface area of the lithium disposed on the negative electrode active material layer is large, the degree of lithium oxidation may excessively proceed. In addition, due to the excessively high reactivity of the negative electrode, an undesired layer, for example, a lithium oxide layer, is formed at the interface between the electrolyte solution and the negative electrode, and thus a resistance of the negative electrode is increased, leading to deterioration in the lifespan characteristic of the battery.

Specifically, the loading amount of the first layer may satisfy Equation 2 below, and more specifically, satisfy Equation 3 below.

$$0.70 \times (x_1-y_1) < \text{loading amount of the first layer} < 0.95 \times (x_1-y_1) \quad \text{[Equation 2]}$$

$$0.85 \times (x_1-y_1) < \text{loading amount of the first layer} < 0.91 \times (x_1-y_1) \quad \text{[Equation 3]}$$

In Equations 2 and 3, the definitions of $x_1$ and $y_1$ are the same as used in Equation 1.

The loading amount of the first layer refers to a capacity per unit weight, and may be calculated using a theoretical capacity per gram of lithium after a difference between weights of the current collector on which the negative electrode active material layer is formed before and after the first layer is formed are measured. In addition, the loading amount of the first layer may be calculated by multiplying a value obtained by multiplying the density (g/cm$^3$) of the first layer and a thickness (cm) of the first layer with the theoretical capacity per gram of lithium (mAh/g). In addition, the loading amount of the first layer may be determined with a difference in irreversible capacity by performing charging/discharging on cells after coin half-cells are manufactured to include an electrode without a first layer and an electrode with a first layer, respectively.

The second layer may be disposed on the first layer.

The second layer may include an inorganic material, and specifically, the second layer may consist of the inorganic material. The second layer may prevent the oxidation of lithium contained in the first layer to facilitate a Li-induced offset of the irreversible capacity of the negative electrode. In addition, when the negative electrode is used together with a separator, mechanical stability, for example, thermal resistance of the separator may be improved.

The inorganic material may be at least one selected from the group consisting of $Al_2O_3$, $SiO_2$ and $ZrO_2$, and specifically, $Al_2O_3$.

The second layer may have a thickness of 50 nm to 500 nm, and specifically, 100 nm to 200 nm. Within in the above-mentioned range, oxidation of the first layer may be effectively prevented, and an excessive electrolytic decomposition reaction may be inhibited. Moreover, an energy density may be maintained at a suitable level, and due to a small interfacial resistance, deterioration in battery performance may be prevented. In addition, after battery assembly, the second layer is disposed between the negative electrode and the separator to improve battery stability, for example, to prevent breakage of the separator.

A method of preparing a negative electrode according to another exemplary embodiment of the present invention, as shown in FIG. 3, may include: disposing a negative electrode active material layer on a current collector; vapor-depositing a first layer containing Li on the negative electrode active material layer using a Li-containing raw material as a source; and disposing a second layer containing an inorganic material on the first layer. The current collector, the negative electrode active material layer, the first layer, and the second layer are the same as the above-described current collector, negative electrode active material layer, first layer and second layer, and therefore descriptions thereof will be omitted.

The disposing of a negative electrode active material layer on a current collector may include applying and drying a composition for forming a negative electrode active material layer on a current collector. The composition for forming a negative electrode active material layer may include a solvent containing a negative electrode active material. The solvent may further include a binder and a conductive material, and the negative electrode active material, binder, and conductive material are the same as the above-described negative electrode active material, binder, and conductive material, and therefore descriptions thereof will be omitted. The solvent may be at least one selected from the group consisting of distilled water and PVDF, but is not necessarily limited thereto.

In the vapor-depositing of a first layer containing Li on the negative electrode active material layer using a Li-containing raw material as a source, the Li-containing raw material may be Li.

The vapor deposition may be accompanied by a heating process. At this time, to reduce deformation of the current collector and the binder, a heating temperature should be 60° C. or less. Therefore, the vapor deposition of the first layer may be performed by at least one selected from the group consisting of sputtering, e-beam, thermal evaporation and atomic layer deposition, and specifically, sputtering.

When the sputtering is used, a deposition speed may be controlled with sputtering power and a partial pressure of a gas such as Ar or $N_2$. In consideration of uniform formation of the first layer and productivity, the sputtering power may be 60 W to 90 W, and the gas partial pressure may be 5 mTorr to 15 mTorr.

When the first layer is formed by vapor deposition, an excessively large loading amount of the first layer may be prevented. In addition, compared with a conventional process of forming a lithium layer in the form of a lithium film, lithium oxidation in the process may be effectively prevented, and therefore battery performance such as a lifespan characteristic may be improved.

The depositing of a second layer may be performed by at least one selected from the group consisting of sputtering, e-beam, atomic layer deposition and other organic wet-coating, and specifically, sputtering.

A secondary battery including the same according to still another exemplary embodiment of the present invention, as shown in FIG. 4, may include a negative electrode, a positive electrode, a separator interposed between the positive electrode and the negative electrode, and an electrolyte, and the negative electrode is the same as the above-described negative electrode. The negative electrode has been described above, and further details are omitted.

The positive electrode may include a positive electrode current collector, and a positive electrode active material layer formed on the positive electrode current collector and containing the positive electrode active material.

In the positive electrode, the positive electrode current collector is not particularly limited as long as it is conductive without causing a chemical change in the battery, and may be, for example, stainless steel, aluminum, nickel, titanium, baked carbon, aluminum, or stainless steel of which a surface is treated with carbon, nickel, titanium or silver. In addition, the positive electrode current collector may conventionally have a thickness of 3 to 500 μm, and an adhesive strength of the positive electrode active material may be increased by forming fine irregularities on a surface of the current collector. For example, various types such as a film, a sheet, a foil, a net, a porous body, a foamed body, and a non-woven fabric body may be used.

The positive electrode active material may be a positive electrode active material conventionally used. Specifically, the positive electrode active material may be a layered compound such as lithium cobalt oxide ($LiCoO_2$) or lithium nickel oxide ($LiNiO_2$) or a compound substituted with one or more transition metals; lithium iron oxides such as $LiFe_3O_4$; lithium manganese oxides represented by the formula $Li_{1+c1}Mn_{2-c1}O_4$ ($0 \leq c1 \leq 0.33$) such as $LiMnO_3$, $LiMn_2O_3$, or $LiMnO_2$; lithium copper oxide ($Li_2CuO_2$); vanadium oxides such as $LiV_3O_8$, $LiFe_3O_4$, $V_2O_5$, or $Cu_2V_2O_7$; Ni site-type lithium nickel oxides represented by the formula $LiNi_{1-c2}Mc_2O_2$ (here, M is at least one selected from the group consisting of Co, Mn, Al, Cu, Fe, Mg, B and Ga, and satisfies $0.01 \leq c2 \leq 0.3$); lithium manganese composite oxides represented by the formula $LiMn_{2-c3}M_{c3}O_2$ (here, M is at least one selected from the group consisting of Co, Ni, Fe, Cr, Zn and Ta, and satisfies $0.01 \leq c3 \leq 0.1$) or $Li_2Mn_3MO_8$ (here, M is at least one selected from the group consisting of Fe, Co, Ni, Cu and Zn); or $LiMn_2O_4$ in which a part of the Li of the above formula is substituted with alkaline earth metal ions, but the present invention is not limited thereto. The positive electrode may be Li-metal.

The positive electrode active material layer may include a positive electrode conductive material and a positive electrode binder, in addition to the above-described positive electrode active material.

At this time, the positive electrode conductive material is used to provide conductivity to an electrode, and in the battery consisting thereof, is not particularly limited as long as it has electrical conductivity without causing a chemical change. A specific example of the positive electrode conductive material may be a graphite such as natural graphite or artificial graphite; a carbonaceous material such as carbon black, acetylene black, ketjen black, channel black, furnace black, lamp black, thermal black or carbon fiber; a metal powder or fiber such as a powder or fiber of copper, nickel, aluminum or silver; a conductive whisker such as zinc oxide, potassium titanate; a conductive metal oxide such as titanium oxide; or a conductive polymer such as a polyphenylene derivative, which may be used alone or in combination of two or more thereof.

In addition, the positive electrode binder serves to improve attachment between positive electrode active material particles and an adhesive strength between the positive electrode active material and the positive electrode current collector. A specific example of the positive electrode binder may be PVDF, PVDF-co-HFP, polyvinyl alcohol, polyacrylonitrile, CMC, starch, hydroxypropylcellulose, regenerated cellulose, polyvinylpyrrolidone, tetrafluoroethylene, polyethylene, polypropylene, an ethylene-propylene-diene monomer (EPDM), sulfonated-EPDM, styrene butadiene rubber (SBR), fluoro rubber, or various copolymers thereof, which may be used alone or in combination of two or more thereof.

The separator separates a negative electrode and a positive electrode and provides a migration path for lithium ions, and any separator used in conventional lithium secondary batteries can be used as a separator without particular limitation. Particularly, one that has a low resistance against the ion migration of an electrolyte, and excellent impregnation of an electrolyte solution is preferred. Specifically, as the separator, a porous polymer film manufactured of a polyolefin-based polymer such as an ethylene homopolymer, a propylene homopolymer, an ethylene/butene copolymer, an ethylene/hexene copolymer and an ethylene/methacrylate copolymer, or a stacked structure of two or more thereof may be used. In addition, as a separator, a conventional porous non-woven fabric body, for example, glass fiber with a high melting point or polyethylene terephthalate fiber, may be used. In addition, to ensure thermal resistance or mechanical strength, a coated separator including a ceramic component or a polymer material may be used, or may be selectively formed in a single- or multi-layer structure.

The electrolyte may be an organic liquid electrolyte, an inorganic liquid electrolyte, a solid polymer electrolyte, a gel-like polymer electrolyte, a solid inorganic electrolyte, or a molten inorganic electrolyte, which can be used in manufacture of a lithium secondary battery, may be used, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy Franc, 2-methyl tetrahydrofuran, dimethyl sulfoxide, 1,3-dioxolane, formamide, dimethylformamide, dioxolane, acetonitrile, nitromethane, methyl formate, methyl acetate, a phosphate triester, trimethoxy methane, a dioxolane derivative, sulfolane, methyl sulfolane, 1,3-dimethyl-2-imidazolidinone, a propylene carbonate derivative, a tetrahydrofuran derivative, ethers, methyl propionate or ethyl propionate may be used.

Particularly, ethylene carbonate and propylene carbonate, which are cyclic carbonates, among the carbonate-based organic solvents, are high-viscosity organic solvents, and can be preferably used because they easily dissociate lithium salts due to high permittivity. When a mixture obtained by mixing the cyclic carbonate with a linear carbonate with low viscosity and low permittivity, such as dimethylcarbonate and diethylcarbonate, in a suitable ratio, is used, an electrolyte having high electrical conductivity can be prepared, which is more preferred.

The metal salt may be a lithium salt, which may be a material that is easily dissolved in the non-aqueous electrolyte solution, and as an anion of the lithium salt, for example, one or more selected from the group consisting of $F^-$, $Cl^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used.

In order to improve the lifespan characteristic of a battery, inhibit a decrease in battery capacity and improve discharge capacity of a battery, the electrolyte may further include, for example, one or more additives selected from a haloalkylene carbonate-based compound such as difluoroethylene carbonate, pyridine, triethyl phosphite, triethanolamine, a cyclic ether, ethylene diamine, n-glyme, hexaphosphoric triamide, a nitrobenzene derivative, sulfur, a quinone imine dye, N-substituted oxazolidinone, N,N-substituted imidazolidine, an ethylene glycol dialkyl ether, an ammonium salt, pyrrole, 2-methoxy ethanol, and aluminum trichloride.

According to yet another exemplary embodiment of the present invention, a battery module including the secondary battery as a unit cell and a battery pack including the same are provided. Since the battery module and battery pack include the secondary battery with a high capacity, a high rate-determining characteristic and a cycle characteristic, they can be used as a power source for any one or more medium-to-large-sized devices selected from the group consisting of an electric vehicle (EV), a hybrid electric vehicle, and a plug-in hybrid electric vehicle (PHEV); and systems for storing electric power.

Hereinafter, exemplary examples are provided to help in understanding the present invention, but it will be apparent to those of ordinary skill in the art that the examples are merely provided to exemplify the description, and various modifications and alternations can be made within the description and the scope of the technical idea. It is obvious that such alternations and modifications are included within the scope of the accompanying claims.

EXAMPLES AND COMPARATIVE EXAMPLES

Preparation Example 1: Preparation of Current Collector Having Negative Electrode Active Material Layer A negative electrode active material (initial efficiency: 79%) in which graphite and SiO were mixed in a ratio of 7:3, carbon black as a conductive material, and carboxylmethyl cellulose (CMC) and styrene butadiene rubber (SBR) as binders were mixed in a weight ratio of 92:3:1.5:3.5, thereby preparing 5 g of a mixture. 28.9 g of distilled water was added to the mixture, thereby preparing a negative electrode slurry. The negative electrode slurry was applied to a copper (Cu) metal thin film having a thickness of 20 μm as a negative electrode current collector to have a base charge capacity (x) of 4.56 mAh/cm$^2$, and a base discharge capacity of 3.66 mAh/cm$^2$, and then dried. At this time, the temperature of the circulated air was 60° C. Subsequently, the resulting thin film was roll-pressed, dried in a vacuum oven at 130° C. for 12 hours, and punched to a size of 3.4 cm×5.0 cm, thereby preparing a current collector having a negative electrode active material layer.

The base charge capacity and the base discharge capacity correspond to a charge loading amount and a discharge loading amount of the above-mentioned negative electrode active material, respectively. The base charge capacity and the base discharge capacity are values measured after a coin half-cell including the current collector having the negative electrode active material layer as a positive electrode and a lithium metal as a negative electrode was prepared. Specifically, the base charge capacity corresponds to a capacity loading amount measured at a charging voltage of 0.005V until charging is cut off at 0.005C in a CC/CV mode, and the base discharge capacity refers to a capacity loading amount corresponding to 1.5V in the coin half-cell.

Example 1: Preparation of Negative Electrode (1) Formation of First Layer

A first layer was formed on the current collector having a negative electrode active material layer prepared in Preparation Example 1 through sputtering. Specifically, a first layer was formed by depositing lithium at the degree of vacuum of 10 mTorr and a gun power of 60 W for 30 minutes by controlling a gas partial pressure in an Ar atmosphere. At this time, the formed first layer had a thickness of 3.93 μm, and a loading amount was 0.81 mAh/cm$^2$. The loading amount of the first layer can be determined by obtaining an irreversible capacity of a coin half-cell including a lithium metal electrode as a negative electrode and a current collector having a negative electrode active material layer, which did not have a first layer, and calculating a difference in irreversible capacity between the above-mentioned coin half-cell and a coin half-cell including a current collector in which the first layer is formed on a negative electrode active material layer.

(2) Formation of Second Layer

A second layer was formed on the first layer by DC magnetron sputtering as follows. Specifically, a second layer was formed by depositing Al$_2$O$_3$ at the degree of vacuum of 10 mTorr and a gun power of 90 W for 1 hour by controlling a gas partial pressure in an Ar atmosphere. At this time, the formed second layer had a thickness of 150 nm.

Comparative Example 1: Preparation of Negative Electrode (1) Formation of First Layer A first layer was formed on the current collector having a negative electrode active material layer prepared in Preparation Example 1. Specifically, the process was the same as the first layer-forming process of Example 1, except that sputtering was performed for 7 minutes, rather than 30 minutes. At this time, the formed first layer had a thickness of 0.89 μm, and a loading amount thereof was 0.185 mAh/cm$^2$.

(2) Formation of Second Layer

A second layer was formed by the same method as described in Example 1.

Comparative Example 2: Preparation of Negative Electrode (1) Formation of First Layer A first layer was formed on the current collector having a negative electrode active material layer prepared in Preparation Example 1. Specifically, the process was the same as the first layer-forming process of Example 1, except that sputtering was performed for 80 minutes, rather than 30 minutes. At this time, the formed first layer had a thickness of 10.32 μm, and a loading amount thereof was 2.128 mAh/cm$^2$.

(2) Formation of Second Layer

A second layer was formed by the same method as described in Example 1.

Comparative Example 3: Preparation of Negative Electrode (1) Formation of First Layer A first layer was formed on the current collector having a negative electrode active material layer prepared in Preparation Example 1. Specifically, the process was the same as the first layer-forming process of Example 1, except that sputtering was performed for 7 minutes, rather than 30 minutes. At this time, the formed first layer had a thickness of 0.89 μm, and a loading amount thereof was 0.185 mAh/cm$^2$.

(2) Formation of Second Layer

A second layer was formed on the first layer. Specifically, the process was the same as the second layer-forming process of Example 1, except that sputtering was performed for 12 minutes, rather than 1 hour. At this time, the formed second layer had a thickness of 30 nm.

Comparative Example 4: Preparation of Negative Electrode (1) Formation of First Layer A first layer was formed on the current collector having a negative electrode active material layer prepared in Preparation Example 1. Specifically, the process was the same as the first layer-forming process of Example 1, except that sputtering was performed for 80 minutes, rather than 30 minutes. At this time, the formed first layer had a thickness of 10.32 μm, and a loading amount thereof was 2.128 mAh/cm².

(2) Formation of Second Layer

A second layer was formed on the first layer. Specifically, the process was the same as the second layer-forming process of Example 1, except that sputtering was performed for 12 minutes, rather than 1 hour. At this time, the formed second layer had a thickness of 30 nm.

Comparative Example 5: Preparation of Negative Electrode (1) Formation of First Layer A first layer was formed on the current collector having a negative electrode active material layer prepared in Preparation Example 1. Specifically, the process was the same as the first layer-forming process of Example 1, except that sputtering was performed for 7 minutes, rather than 30 minutes. At this time, the formed first layer had a thickness of 0.89 μm, and a loading amount thereof was 0.185 mAh/cm².

(2) Formation of Second Layer

A second layer was formed on the first layer. Specifically, the process was the same as the second layer-forming process of Example 1, except that sputtering was performed for 240 minutes, rather than 1 hour. At this time, the formed second layer had a thickness of 600 nm.

Comparative Example 6: Preparation of Negative Electrode

A first layer was formed on the current collector having a negative electrode active material layer prepared in Preparation Example 1. Specifically, the process was the same as the first layer-forming process of Example 1, except that sputtering was performed for 80 minutes, rather than 30 minutes. At this time, the formed first layer had a thickness of 10.32 μm, and a loading amount thereof was 2.128 mAh/cm².

(2) Formation of Second Layer

A second layer was forming on the first layer. Specifically, the process was the same as the second layer-forming process of Example 1, except that sputtering was performed for 240 minutes, rather than 1 hour. At this time, the formed second layer had a thickness of 600 nm.

Comparative Example 7: Preparation of Negative Electrode (1) Formation of First Layer A first layer was formed on the current collector having a negative electrode active material layer prepared in Preparation Example 1. Specifically, a lithium film (thickness: 20 μm) formed by roll-pressing was combined with the negative electrode active material layer, followed by lamination. A loading amount of the first layer formed thereby was 4.111 mAh/cm².

(2) Formation of Second Layer

A second layer was formed by the same method as described in Example 1.

EXPERIMENTAL EXAMPLE

Experimental Example 1: Evaluation of Initial Capacity and Capacity Retention Ratio Batteries including the negative electrodes of Example 1, and Comparative Examples 1 to 7 were manufactured, and their initial capacities and capacity retention ratios were evaluated.

A mono cell was prepared by interposing a 6-μm polyolefin separator between a positive electrode including Li[Ni$_{0.8}$Mn$_{0.1}$Co$_{0.1}$]O$_2$ as a positive electrode active material and each of the negative electrodes of Example 1 and Comparative Examples 1 to 7, and injecting an electrolyte solution in which 0.5 wt % of vinylene carbonate was dissolved in a mixed solution of methylethyl carbonate (EMC) and ethylene carbonate (EC) in a volume ratio of 7:3, and 1M LiPF$_6$ was dissolved.

Charging/discharging was performed on the prepared mono cell at 0.2C one to three times, and then at 0.7C from the fourth time. A potential range for charging/discharging was 2.5V to 4.2V, and the initial capacity was the first discharge capacity. The capacity retention ratio was derived by calculation as follows.

Capacity retention ratio (%)=(100$^{th}$ discharge capacity/1$^{st}$ discharge capacity)×100

Experimental Example 2: Evaluation of Thickness Variation

An in-situ swelling cell which can observe a change in thickness of an electrode during charging/discharging was prepared. Specifically, like the mono cell, in the in-situ swelling cell, there was an electrode assembly between an upper plate and a lower plate having a spring capable of imparting a pressure, so that the thickness change in an electrode according to charging/discharging can be checked in real time.

The thickness variation was calculated by the following calculation.

Thickness variation (%)=[(electrode thickness after charging/discharging for 100 times−initial electrode thickness)/initial electrode thickness]×100

TABLE 1

| | Loading amount of first layer (mAh/cm²) | Thickness of second layer (nm) | Initial capacity (mAh) | Capacity retention ratio (%) | Thickness variation (%) |
|---|---|---|---|---|---|
| Example 1 | 0.81 | 150 | 45.5 | 93 | 28 |
| Comparative Example 1 | 0.185 | 150 | 41.2 | 84 | 28 |
| Comparative Example 2 | 2.128 | 150 | 44.1 | 87 | 69 |
| Comparative Example 3 | 0.185 | 30 | Low-voltage defective battery (not measurable) | Impossible to cycle | — |

TABLE 1-continued

|  | Loading amount of first layer (mAh/cm²) | Thickness of second layer (nm) | Initial capacity (mAh) | Capacity retention ratio (%) | Thickness variation (%) |
|---|---|---|---|---|---|
| Comparative Example 4 | 2.128 | 30 | Low-voltage defective battery (not measurable) | Impossible to cycle | — |
| Comparative Example 5 | 0.185 | 600 | 40.7 | 83 | 29 |
| Comparative Example 6 | 2.128 | 600 | 42.9 | 86 | 73 |
| Comparative Example 7 | 4.111 | 150 | 41.4 | 21 | 163 |

Referring to Table 1, when the negative electrode of Example 1 is used, compared with when the negative electrodes of Comparative Examples 1 to 7 were used, it can be seen that the initial capacity and capacity retention ratio were high, and thickness variation was maintained at a low level. Therefore, it can be seen that the irreversible capacity problem can be solved by the appropriate loading amount of the first layer and a filling depth can be lowered, thereby improving the lifespan characteristic. Meanwhile, in Comparative Example 3 and Comparative Example 4, it can be confirmed that the thickness of the second layer is so small that the separator in the battery is broken. In addition, in the case of Comparative Example 7 in which the first layer is formed by roll-pressing, rather than vapor deposition such as sputtering, the loading amount of the first layer must be excessively large, so that an excessive amount of lithium is precipitated on an electrode surface. In addition, due to oxidation of the lithium film which is generated during the deposition of the lithium film, the irreversible capacity problem cannot be smoothly resolved. As a result, in the case of Comparative Example 7, due to the above-mentioned reason, problems in that the thickness of the negative electrode is greatly increased, and the capacity retention ratio was significantly reduced are caused.

The invention claimed is:

1. A negative electrode, comprising:
a current collector;
a negative electrode active material layer disposed on the current collector;
a first layer disposed on the negative electrode active material layer and containing Li; and
a second layer disposed on the first layer and containing an inorganic material, wherein the inorganic material is $Al_2O_3$,
wherein the negative electrode active material layer contains a negative electrode active material, and the negative electrode active material consists of graphite and $SiO_x$ (0<x<2),
wherein a loading amount of the first layer satisfies Equation 1 below:

$$0.65 \times (x_1 - y_1) < \text{loading amount of the first layer} < 0.95 \times (x_1 - y_1), \quad [\text{Equation 1}]$$

in Equation 1, $x_1$ is a charge loading amount of the negative electrode active material layer, $y_1$ is a discharge loading amount of the negative electrode active material layer,
units of the loading amount of the first layer, the charge loading amount and the discharge loading amount are mAh/cm², and
the charge loading amount and the discharge loading amount are capacities per unit area measured in a half-cell which includes a lithium metal electrode and an electrode including the negative electrode active material layer,
wherein the charge loading amount is a capacity per unit area of the half-cell when a charging current decreases to 0.005C after the half-cell is charged at a constant current (CC) until a potential difference of the electrode including the negative electrode active material layer with respect to the lithium metal electrode becomes 0.005V, and then charged at a constant voltage (CV), and
the discharge loading amount is a difference between the capacity per unit area of the half-cell and the charge loading amount when a potential difference of the electrode including the negative electrode active material with respect to the lithium metal electrode while the half-cell is discharged at a constant current becomes 1.5V.

2. The negative electrode according to claim 1, wherein the first layer consists of Li.

3. The negative electrode according to claim 1, wherein the second layer has a thickness of 50 nm to 500 nm.

4. A secondary battery, comprising:
the negative electrode of claim 1;
a positive electrode;
a separator interposed between the positive electrode and the negative electrode; and
an electrolyte.

5. The secondary battery according to claim 4, wherein the first layer consists of Li.

6. The secondary battery according to claim 4, wherein the second layer has a thickness of 50 nm to 500 nm.

7. The negative electrode according to claim 1, wherein the second layer consists of the inorganic material.

* * * * *